United States Patent

[11] 3,604,000

[72] Inventors Anthony Brinna
Lexington;
Arthur Crain, Framingham; Burrell R. Hatcher, Bedford; Edward J. Sheldon, Lexington, all of, Mass.
[21] Appl. No. 846,333
[22] Filed July 31, 1969
[45] Patented Sept. 7, 1971
[73] Assignee Raytheon Company
Lexington, Mass.

[54] ANTENNA TESTING APPARATUS AND METHOD
5 Claims, 1 Drawing Fig.
[52] U.S. Cl. ........................................................ 343/17.7
[51] Int. Cl. ........................................................ G01s 7/40
[50] Field of Search ........................................... 343/17.7

[56] References Cited
UNITED STATES PATENTS
3,221,328  11/1965  Isch ........................... 343/17.7 X
3,449,746  6/1969  Begemen et al. ............ 343/17.7

Primary Examiner—T. H. Tubbesing
Attorney—Philip J. McFarland

ABSTRACT: An antenna radiation pattern-measuring system and method for permitting measurement of a selected parameter of a pattern to be measured without requiring the use of a standard target or a remotely located receiver. According to the invention, the beam from an optically fed phased array is periodically focused on a sensor, which may be the feed horn of the antenna, so that substantially all of the energy radiated in the test beam or beams from the array is utilized to measure the selected parameter.

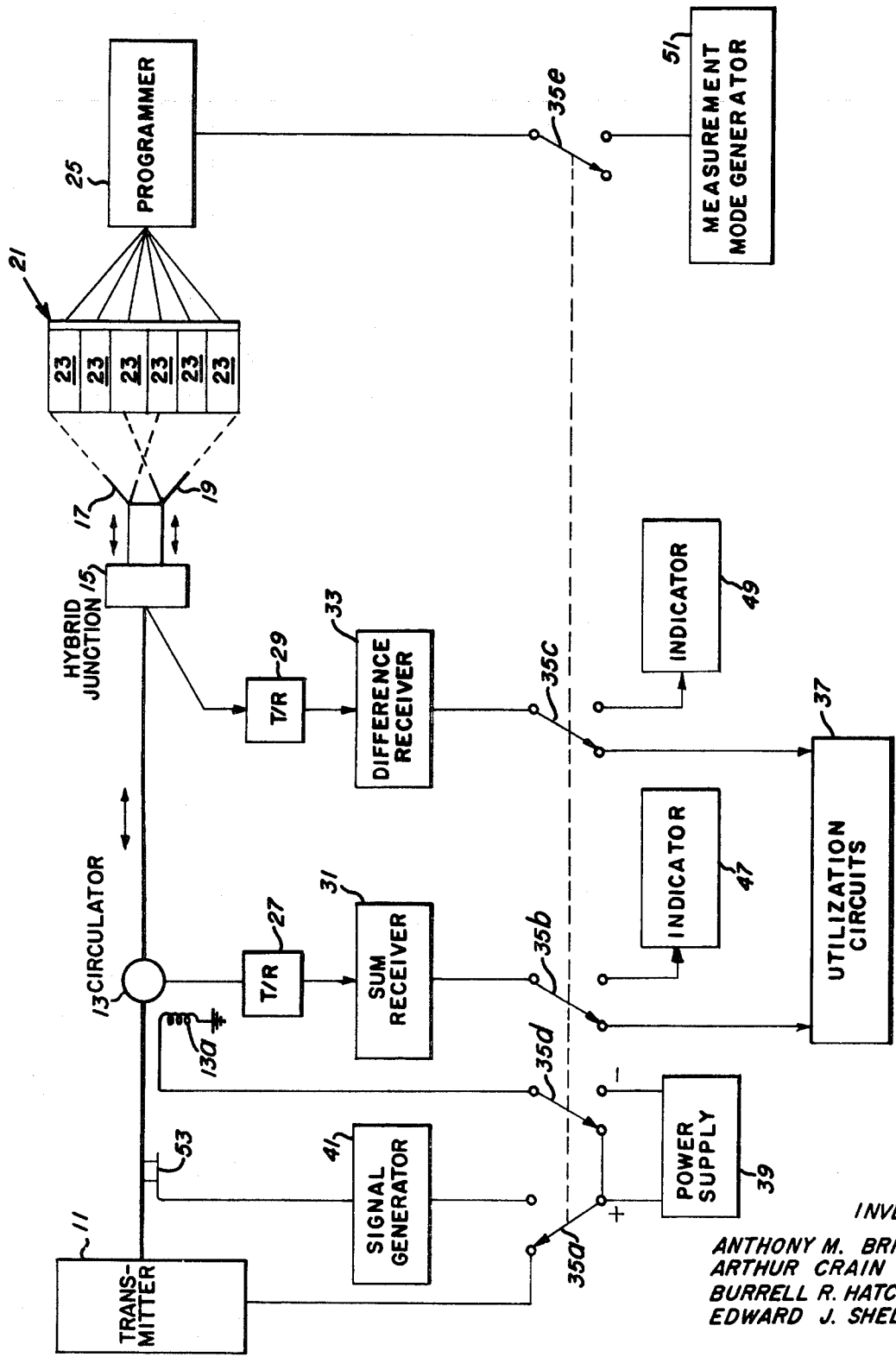

ANTENNA TESTING APPARATUS AND METHOD

BACKGROUND OF THE INVENTION

This invention pertains generally to radiofrequency measuring apparatus and methods and particularly to apparatus and method for measuring selected parameters of radiated antenna patterns.

It is well known in the art that measurement of "far-zone" radiation patterns may not be easily or accurately accomplished unless the receiving antenna (if a "oneway" measurement is being made), or the standard target (if a "twoway" measurement is being made), is actually in the far-zone of the antenna system whose pattern is being measured. It is, however, also known that if special techniques are utilized that satisfactory measurements of far-zone radiation patterns may be accomplished with the measuring device in the usual "near-zone" of the antenna whose pattern is to be measured. Among such special techniques, for example, are those shown in Bickmore, U.S. Pat. No. 3,039,098, issued June 12, 1962, in which mechanical distortion or "electrical aperture compensation" is used to shift the focal point of the beam from an antenna array, thereby permitting a desired far-zone measurement to be made in the normal near-zone of the antenna using known techniques.

Because it is an absolute requirement that everything required for testing or monitoring an airborne radar system be carried on the supporting vehicle, no known testing or measuring systems are, however, adequate. That is, all known systems include external targets or receiving equipment or require added mechanisms or circuit components which are either too heavy or complex to be useful.

It is well known that up to 10 percent random failures of elements can be tolerated in phased arrays employing a large number of elements without significant change in antenna performance. Therefore, a practical operational measurement technique must be sufficiently sensitive to detect $\Sigma$ pattern level changes of this order. Further, any significant amount of nonrandom failures of array elements produces radiation pattern variations which can be detected by monopulse measuring techniques. Therefore, in many operational situations it has been found that measurement of total power in the radiated beam and measurement of the so-called boresight error of an antenna array are sufficient for operational purposes, so it is not necessary to provide complete pattern measuring equipment. When a measurement of total power in, or boresight error of, a beam is an adequate check of the antenna radiation pattern, it is likely that operational conditions are such that the time taken for any measurement should be kept to a minimum. That is, it is desirable that any test of an operational system be rapidly accomplished in order that the "down time" of the system be minimized. It is thus clear that any measurement method which involves the distortion of an element of an antenna system, when such distortion involves movement of either a radiating element or a reflector, must be relatively slow.

Therefore, it is a primary object of this invention to provide improved antenna array testing method and apparatus for periodically testing selected parameters of a radiation pattern;

It is another object of this invention to provide improved antenna array testing method and apparatus for periodically testing selected parameters of a radiation pattern without physically distorting any element of the array;

Still another object of this invention is to provide improved antenna array testing method and apparatus which does not require the use of a separate receiving antenna or standard target.

SUMMARY OF THE INVENTION

These and other objects of this invention are attained generally in an airborne optically fed reflection-type array by providing, in addition to the conventional collimation and beam steering command signals, a periodically generated command signal which causes either substantially all of the radiofrequency energy normally radiated to be directed back to the radiating source or a controlled fraction of the radio energy normally radiated to be directed back to the radiating source. Either of these conditions can be produced by the command signals which control the array element-phasing patterns. When this is done, conventional power measurement apparatus may be used to measure the power radiated by the antenna array. Further, if more than one radiating source is incorporated in the antenna array, as in a multihorn or multiport monopulse feed, the relative amounts of radiofrequency energy so reflected may be measured to determine boresight error.

BRIEF DESCRIPTION OF THE DRAWING

For a more complete understanding of this invention, reference is now made to the drawing in which:

The single FIGURE is a simplified block diagram of an amplitude monopulse system with a preferred embodiment of this invention arranged for testing boresight error of a phased antenna array.

DESCRIPTION OF THE PREFERRED EMBODIMENT

Before referring to the FIGURE, it should be noted that the illustrated antenna array form a reflector-type optically fed antenna of the type shown and described in U.S. Pat. No. 3,305,867 to Miccioli et al., issued on Feb. 21, 1967 and assigned to the same assignee as this application. Because this is so, and because neither the antenna array, per se, nor the programmer illustrated is deemed to be novel to this invention, reference to the just-cited patent should be made for a detailed explanation of the working of the illustrated array and programmer in a monopulse system. Suffice it to say here that, in operation, energy generated in the transmitter is radiated from each one of the feed horns to impinge on the reentrant-type phase shifters. Each individual one of the latter elements is so energized by the programmer as to collimate and steer the finally propagated beams. After reflection from a target, echo signals in both beams are directed back into the feed horns and processed to obtain the sum and difference signals characteristic of monopulse radar systems. It should also be noted that, in order to illustrate the invention most clearly, the radar system with which it is associated has been illustrated in the most rudimentary form possible, omitting known system components and assemblies which are not essential to an understanding of the invention. For example, no system timing means, as would be required in an operating system, are shown.

Referring now to the FIGURE, it may be seen that a conventional amplitude monopulse system is easily adapted to this invention. Such a system includes a transmitter 11 which, when pulsed, feeds RF energy over a transmission line (unnumbered) to a circulator 13 and thence through a hybrid junction 15 to a pair of feed horns 17, 19. The latter elements are preferably identical, being as closely spaced as is feasible. Energy from each of the feed horns 17, 19 is radiated on to an antenna array 21 which includes a matrix of reentrant phase shifters 23. Each one of the phase shifters 23 in turn is energized by a control signal from a programmer 25 ultimately to form the required pair of overlapping beams (not shown) for monopulse operation.

Echo signals from targets in the far field illuminated by the beams impinge on the reentrant phase shifters 23 and are thereby directed back to the feed horns 17, 19, passing therefrom through the hybrid junction 15 and, after being processed to produce a sum and a difference signal, to a pair of transmit/receive switches 27, 29 and a sum receiver 31 and a difference receiver 33. The output signal from the sum receiver 31 is fed through switch 35b and the output signal from the difference receiver 33 is fed through switch 35c to the utilization circuits 37 of the system.

The measurement mode contemplated by the invention is effected by moving the switches 35a, 35b, 35c35e from their illustrated positions to their second positions. Such movement effects the following: (1) disconnection of the transmitter 11 from a power supply 39 and connection of a signal generator 41; (2) disconnection of the sum receiver 31 and the difference receiver 33 from the utilization circuits and connection of each one of such receivers to an indicator 47, 49; and (3) connection of the programmer 25 to a measurement mode generator 51.

The output signal from signal generator 41, on passing through a directional coupler 53, is passed to the circulator 13. That element directs the output signal from the signal generator to the hybrid junction 15, bypassing the transmit/receive switches 27, 29 so that neither the sum receiver 31 nor the difference receiver 33 may receive such signal. The feed horns 17, 19, however, are responsive as before to propagate signals to the reentrant phase shifters 23. The latter elements are again each energized by a control signal from the programmer 25. The latter element produces control signals in accordance with the measurement mode generator 51 to redirect energy impinging on each reentrant phase shifter 23 back to the feed horns 17, 19. Such redirected energy is passed to the hybrid junction 15, divided into sum and difference signals as before, and applied through the transmit/receive switches 27, 29 to the sum receiver 31 and the difference receiver 33. The output signals from the latter two elements are applied to the indicators 47, 49.

A moment's thought will make it clear that, assuming each one of the elements of the radar in the just described circuit path to be properly operating with each element phased to redirect all the energy back to the feedhorns and the level of the signal out of the signal generator 41 to be below the saturation level of the sum receiver 31 and the difference receiver 33, a maximum difference in signal will be noted at the indicators 47, 49. In other words, when the radar elements affecting the redirected energy are operating properly, indicator 47 shows a maximum and indicator 49 shows a minimum. Any change, then, in ratio of the outputs of the indicators 47, 49 reflects a change in the elements in the path of the redirected energy. In such a situation—neglecting the extremely improbable case of failure of individual ones of the reentrant phase shifters 23 which affect both propagated beams equally—a boresight error occurs when the system is operated normally. Such an error shows up in the test mode here being described by a change in the ratio of the outputs of the indicators 47, 49. Further, the use of variations in the array element phasing can produce patterns in which known variations of the sum to difference channel ratio or the sum channel level itself can be used to isolate array element failures to specific array element groupings. While changes in the sum receiver 31, the difference receiver 33, or other active units in the path of the redirected energy can also change this ratio, individual unit tests which are well established in the art can be used to isolate these sources of error when they occur.

It will be obvious to those of skill in the art that the disclosed arrangement may easily be modified, without departing from the inventive concept, to provide for indications of other parameters besides boresight error. For example, it would be obvious to provide conventional power calibration means for the signal generator 41 so that the output signal of the indicator 47 would be representative of total radiated power of the system. This can be accomplished by switch 35b and 35d which permit the test signal to be directly received in the sum channel receiver. In view of the obviousness of such a change and of others not mentioned it is felt that this invention should not be restricted to its disclosed embodiment but rather should be limited only by the spirit and scope of the appended claims.

What is claimed is:

1. In a radar system normally operated sequentially to generate radiofrequency signals in a transmitter, then to form and propagate such signals in a collimated beam from an antenna array including a radiating source and beam-forming elements and, finally, to pass reflected signals from distant targets back through such array to a receiver, a monitoring arrangement comprising:
    a. first means for periodically adjusting each one of the beam-forming elements in the antenna array to focus energy propagated therefrom on the radiating source;
    b. second means synchronously operated with the first means for energizing the radiating source with radiofrequency energy to actuate the beam-forming elements; and
    c. third means for measuring a predetermined parameter of the radiofrequency energy finally propagated from the beam-forming elements and returned to the radiating source.

2. A monitoring arrangement as in claim 1 wherein:
    a. the radiating source is at least one feed horn;
    b. each one of the beam-forming elements includes at least one reentrant phase shifter for the radio frequency energy, each such phase shifter being responsive to a control signal impressed thereon to change the phase energy redirected thereby; and,
    c. the first means includes a source of control signals to change the phase of the radiofrequency energy to effect focusing of energy redirected by the at least one reentrant phase shifter on the radiating source.

3. A monitoring arrangement as in claim 2 wherein the third means includes means for measuring the sum of and the difference between the power of the radiofrequency energy returned to each feed horn of a selected pair thereof.

4. A monitoring arrangement as in claim 2 wherein the third means includes radiofrequency power means for measuring the power of the radiofrequency energy returned to the at least one feed horn.

5. The method of monitoring a selected parameter of the radiation pattern of an antenna array which includes at least one radiating element and a plurality of individually adjustable beam-forming elements comprising the steps of:
    a. periodically adjusting each one of the beam-forming elements to focus energy redirected therefrom back to the at least one radiating element;
    b. measuring a predetermined parameter of such redirected energy; and
    c. readjusting each one of the beam-forming elements to restore the normal radiation pattern of the antenna array.